May 19, 1925. 1,538,658
V. R. RINDT
FISHING BAIT
Filed May 14, 1924
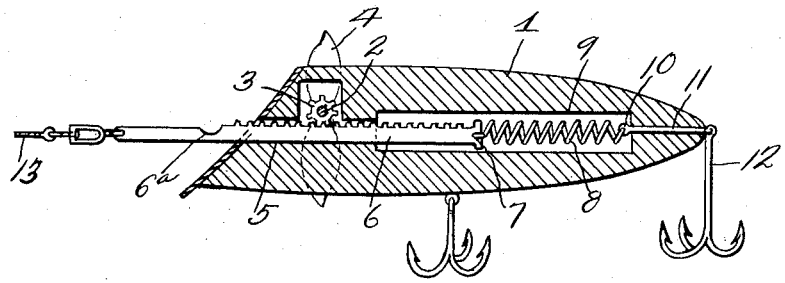
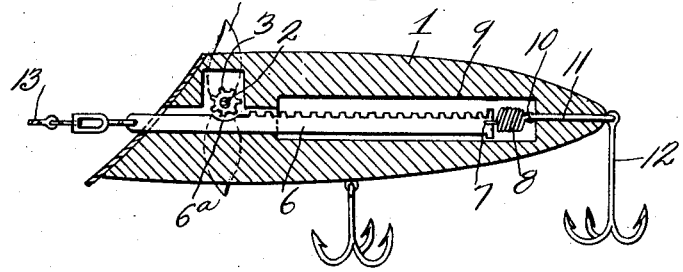
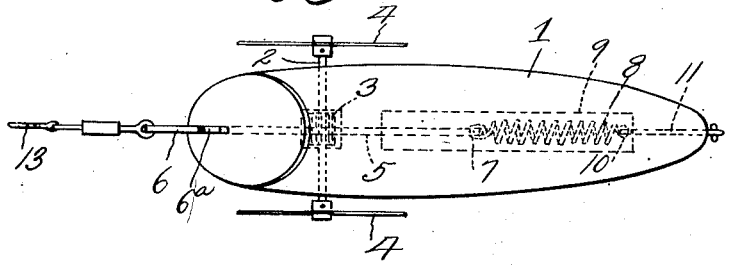
Inventor
Vincent R. Rindt
By George J. Ottsch
Attorney Patented May 19, 1925.

1,538,658

UNITED STATES PATENT OFFICE.

VINCENT R. RINDT, OF WINTER, WISCONSIN.

FISHING BAIT.

Application filed May 14, 1924. Serial No. 713,353.

*To all whom it may concern:*

Be it known that I, VINCENT R. RINDT, a citizen of the United States, residing at Winter, in the county of Sawyer and State of Wisconsin, have invented certain new and useful Improvements in Fishing Baits, of which the following is a specification.

The invention relates to fishing lures, and has for its object to provide a device of this character having rotatable spinners, and which spinners are automatically rotated when the bait strikes the water, and the line becomes slack after a casting operation, thereby providing a more active lure for fishing.

A further object is to provide a lure provided with spinners, which spinners will be automatically rotated by imparting jerks on the fish line during a trolling operation, and which rotating of the spinners takes place during the jerking operation, and when slack is allowed in the line after each jerking operation.

A further object is to form the spinners relatively thin and flat, thereby minimizing the resistance as the bait is drawn through the water, and so that the water will offer little resistance to the spinning of the spinners.

A further object is to provide a transversely disposed shaft extending through the body of the lure and having spinners mounted on its ends and disposed preferably in vertical longitudinal planes, a pinion on the shaft, and a reciprocating rack longitudinally disposed within the body of the lure and having connected thereto a coiled spring for normally forcing the rack inwardly against the action of a fish line. Also to tension the coiled spring whereby during a casting operation the rack will be pulled forwardly, and when the lure strikes the water said rack will be pulled into the body of the lure by said spring, thereby rotating the spinner shaft and moving the rack out of mesh with the pinion and allowing the continued spinning of the spinners until they lose their momentum. The same result is obtained during trolling by imparting jerks intermittently on the fish line.

With the above and other objects in view the invention resides in the combination and arrangement of parts as hereinafter set forth shown in the drawing, described and claimed it being understood that changes in the precise embodiment of the invention may be made within the scope of what is claimed without departing from the spirit of the invention.

In the drawing:—

Figure 1 is a vertical longitudinal sectional view through the lure showing the rack partially withdrawn from the bait body when casting.

Figure 2 is a vertical longitudinal sectional view through the lure, showing the rack in inner inoperative position.

Figure 3 is a top plan view of the lure.

Referring to the drawing, the numeral 1 designates the body of the lure, which body may be formed from any suitable material, built up if desired from a number of pieces of material, thereby allowing the working parts hereinafter set forth to be assembled within the body. The body 1 adjacent its forward end is provided with a transversely disposed shaft 2 on which is mounted a pinion 3, and on the outer ends of which relatively thin flat spinners 4 are secured. The spinners 4 are rotated by mechanism hereinafter set forth at the end of a casting operation, or during a trolling operation for providing a more active lure, especially during the momentary stops of the same, as for instance when the lure strikes the water and before reeling in takes place. By forming the spinners 4 flat and from relatively thin material, it will be seen that the resistance of the water on the spinners during the spinning operation will be reduced to a minimum.

Slidably mounted in a longitudinally disposed bearing 5 in the body 1 of the lure is a longitudinally disposed rack 6, with which rack the pinion 3 meshes, therefore it will be seen that when the rack 6 is moved outwardly or inwardly during a casting operation, and at the end of a casting operation, the pinion 3 will be rotated and consequently the spinners 4 will rotate. Secured at 7 to the inner end of the rack 6 is a coiled spring 8, which coiled spring is disposed in a chamber 9 of the body 1 of the lure and is anchored at 10 to a longitudinally disposed rod 11, which rod supports the rear hook 12 of the lure. Spring 8 is a contractible one, therefore it will be seen that during a casting operation, when the fish line 13 is taut, the rack 6 will be pulled outwardly against the action of the spring 8, thereby rotating the pinion 3 and moving the rack to a position where its inner end will be adjacent the pinion 3. Immediately upon the lure striking the water, at which time slack developes in the line 13, the coiled spring 8 will rapidly pull the rack 6 inwardly into the bait body 1 and rotate the pinion 3, and the spinners 4 carried by the shaft 2. The above operation is a relatively rapid one, and consequently the spinners 4 are rapidly rotated as the rack 6 is drawn within the bait body, consequently the rack 6 will be moved to a position as shown in Figure 2 where the pinion 3 is out of mesh with the rack and in registration with the recess 6ª adjacent its forward end, therefore the momentum imparted to the spinners 4 by the rack will not be broken and the spinners will continue to rotate under their own momentum, and until the reeling in operation, which generally takes place immediately after a casting one. When trolling jerks are intermittently imparted on the line 13, and it will be seen that when a jerk is imparted, the resistance of the bait body 1 will be sufficient within the water to allow the rack 6 to be partially withdrawn from the forward end of the bait body and after the jerks as slack takes place in the line 13, the spring 8 will pull the rack inwardly and the spinners will operate in the same manner as set forth in a casting operation.

From the above it will be seen that a fish lure is provided with means whereby spinners will be rotated automatically when bait strikes the water during a casting operation or when jerks are imparted on a line during a trolling operation. It will also be seen that rack and pinion means are provided for rotating the spinners in connection with a spring, and said spinners will continue to operate after the rack and pinion are out of mesh until their momentum stops. It will also be seen that a more active bait is provided than the conventional form of spinner baits now in use wherein the rotation of the spinners is accomplished through the medium of the current of water or dragging the bait through the water.

The invention having been set forth what is claimed as new and useful is:—

1. The combination with a fish lure having a rotatable spinner, a fishing line attached to said lure, of motor means carried by the lure and controlled by the fishing line whereby said spinner may be rotated.

2. The combination with a fishing lure having rotatable spinners, a fishing line attached to said lure, of motor means carried by the lure and controlled by the fishing line, whereby said spinners may be rotated.

3. The combination with a fishing lure having a rotatable spinner, a fishing line attached to said lure, a motor means carried by the lure and controlled by the fishing line, whereby during a casting operation when the lure strikes the water said spinner will be automatically rotated.

4. The combination with a fishing lure having rotatable spinners, a fishing line attached to said lure, of means carried by the lure and controlled by the fishing line whereby when the lure is in the water rotation will be automatically imparted to the spinners upon slack in the line after a pull on the line.

5. The combination with a fishing lure, a fishing line, of rotatable spinners carried by said lure, of means for rotating said spinners during casting and trolling operations, said means comprising a rack, a gear connection between the rack and the spinners, a contractible coiled spring cooperating with the rack for normally maintaining the same in inner position, said fishing line being attached to the outer end of said rack.

6. The combination with a fishing lure, a fishing line, rotatable spinners carried by said lure, said spinners being mounted on a transversely disposed shaft, of means for automatically rotating said spinners, said means comprising a rack slidably mounted within the lure, a pinion carried by said shaft and positioned whereby upon an outward movement of the rack it will mesh therewith, a contractible spring connected to said rack and forming means for imparting an inward movement on the rack, said fishing line being attached to the outer end of the rack.

7. A fishing lure comprising a body member, a longitudinally movable rack mounted in said body member, a transversely disposed shaft, spinners mounted on the transversely disposed shaft, a pinion carried by said shaft and positioned whereby upon an outward movement of the rack it will mesh therewith, a spring connected to said rack and normally imparting an inward pull thereon, and means whereby a fishing line may be attached to said rack.

8. A fishing lure comprising a body member, a longitudinally movable rack mounted in said body member, a transversely disposed shaft, a spinner mounted on said shaft, a pinion carried by said shaft and positioned whereby upon an outward movement of the rack it will mesh therewith and upon an inward movement of the rack it will move out of mesh therewith, spring means for normally forcing the rack inwardly, and means whereby a fishing line may be attached to said rack.

9. A fishing lure comprising a body member, a longitudinally movable rack mounted in said body member, a shaft adjacent said rack, spinners mounted on said shaft and rotatable therewith, a pinion carried by said shaft in the path of the rack and normally out of mesh with the rack, spring means for normally maintaining the rack in normal position, and means whereby a fishing line may be attached to said rack for controlling the movement thereof.

10. The combination with a fishing lure, rotatable spinners carried by said lure, a fishing line, of spring controlled motor means carried by the lure and controlled by the line, whereby said spinners may be rotated when the lure is in the water.

11. The combination with a fishing lure, a rotatable spinner carried by said lure, a fishing line, of spring controlled motor means carried by the lure and controlled by the line whereby said spinner may be rotated.

12. The combination with a fishing lure, rotatable spinners carried by said lure, a fishing line, of spring controlled motor means carried by the lure and controlled by the line whereby said spinners may be rotated and allowed to rotate under their own momentum.

13. The combination with a fishing lure, rotatable spinners carried by said lure, a fishing line, a spring controlled motor means carried by the lure and controlled by the line whereby said spinners may be rotated and allowed to rotate under their own momentum, said motor means comprising a rack bar, a shaft on which the spinners are mounted, a pinion carried by said shaft in the path of the teeth of the rack bar and normally out of mesh therewith, and a coiled spring cooperating with the rack for normally maintaining the same in retracted position.

In testimony whereof I affix my signature.

VINCENT R. RINDT.